United States Patent [19]

Sartain et al.

[11] Patent Number: 4,856,622
[45] Date of Patent: Aug. 15, 1989

[54] AUXILIARY ACTUATION MECHANISM FOR A BRAKE ASSEMBLY

[75] Inventors: Stephen C. Sartain, Plainfield; Richard W. Chamberlain, Montgomery, both of Ill.

[73] Assignee: Caterpillar Inc., Peoria, Ill.

[21] Appl. No.: 298,294

[22] Filed: Jan. 17, 1989

Related U.S. Application Data

[63] Continuation of Ser. No. 121,186, Nov. 16, 1987, abandoned.

[51] Int. Cl.[4] ............................................. F16D 65/24
[52] U.S. Cl. ................................. 188/170; 74/480 R; 251/289; 303/2; 303/6.01; 303/13
[58] Field of Search .............. 188/170, 106 F; 303/2, 303/6.01, 13, 19; 251/289; 74/480 R

[56] References Cited

U.S. PATENT DOCUMENTS

| B 545,856 | 3/1976 | Schexnayder | 188/170 X |
|---|---|---|---|
| 2,270,431 | 1/1942 | Freeman | 188/170 |
| 3,613,839 | 10/1971 | MacDuff | 188/170 |
| 3,995,426 | 12/1976 | Habiger | 74/480 R X |
| 3,999,075 | 12/1976 | Johnson et al. | 303/63 |
| 4,119,000 | 10/1978 | Venable | 74/480 R X |
| 4,190,298 | 2/1980 | Klope | 303/2 |
| 4,245,724 | 1/1981 | Beck | 188/170 |
| 4,293,164 | 10/1981 | Hoefer et al. | 303/13 |

FOREIGN PATENT DOCUMENTS

| 2261912 | 9/1975 | France | 303/6 M |
|---|---|---|---|
| 552292 | 11/1976 | Italy | 251/289 |

Primary Examiner—George E. A. Halvosa
Attorney, Agent, or Firm—William C. Perry

[57] ABSTRACT

In the braking systems of many vehicles, a parking brake is utilized that is spring applied and fluid pressure released. In the event of a mechanical breakdown, a mechanical device or other specialized tools must be used to bring about the disengagement of the parking brake so that the vehicle may be towed. The present invention overcomes this problem by providing an auxiliary actuating mechanism for a spring applied, fluid pressure released parking brake that includes an auxiliary accumulator that will maintain a preselected amount of pressure upon the loss of the primary source of pressure. An auxiliary actuating valve is positioned between the accumulator and the parking brake to selectively communicate fluid therebetween. The auxiliary actuating mechanism is provided with two remotely located actuators that may be utilized to selectively position the valve to permit the communication of the pressurized fluid within the accumulator with the parking brake assembly to achieve the disengagement thereof.

13 Claims, 1 Drawing Sheet

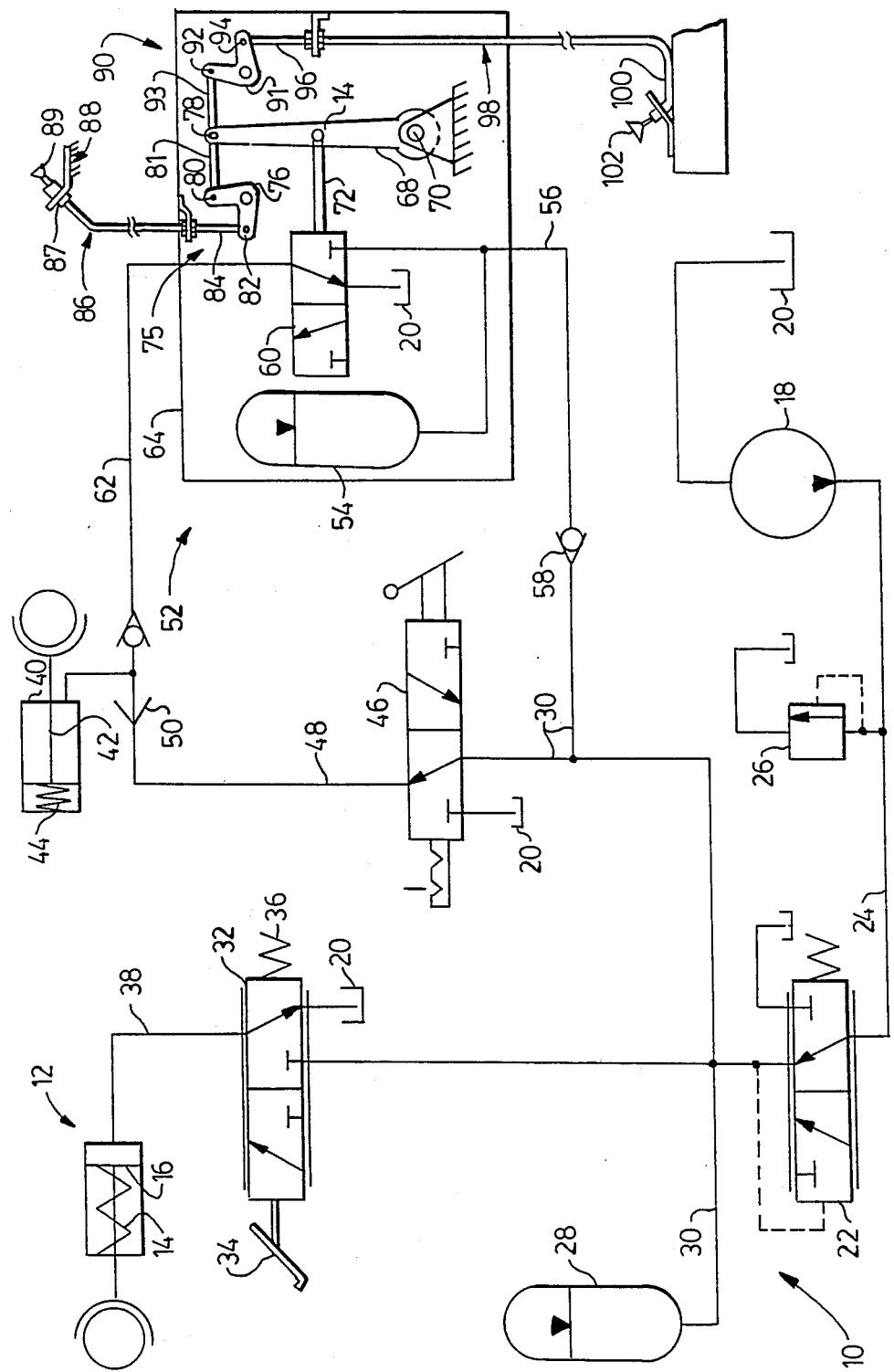

AUXILIARY ACTUATION MECHANISM FOR A BRAKE ASSEMBLY

This is a continuation of Ser. No. 121,186, filed Nov. 16, 1987, now abandoned.

DESCRIPTION

1. Technical Field

This invention relates to an actuating mechanism for a brake assembly and more particularly to a means by which a brake assembly may be release from at least two remote locations.

2. Background Art

The braking systems utilized on many present day construction vehicle are of the type that are spring applied and fluid pressure released. One advantage that is gained by this type of brake is that in many cases the service brakes may also be used as a parking brake when the vehicle is shut down or otherwise rendered inoperable. Other designs utilize a spring applied, pressure released brake that is separate from the service brakes and is engaged with a drive train component to prevent movement of the vehicle without having to shut down the engine. Regardless of how the spring applied brake is utilized, in the event of a mechanical failure some provision must be made to release the brakes so the vehicle may be pushed or towed to a location wherein the necessary repairs may be made.

There are a variety of methods and apparatus that have been utilized to provide the release of the vehicle brakes in absence of fluid pressure that normally maintains the brakes in their released condition. Some systems utilize both air and hydraulic pressure for brake operation. While normal release of the brakes is generally attained by introduction of fluid from an engine driven pump, in some instances provision is made to release the brakes with pressure from a source of pressurized air in the event of a hydraulic failure. One such system is disclosed in U.S. Pat. No. 3,999,075 issued to P. R. Johnson, et al on Dec. 21, 1976. In this patent, a brake control system is described that includes a combined air and hydraulic circuitry. The brakes are released initially by hydraulic fluid that is delivered by an engine driven pump to the vehicle's transmission. The fluid pressure interacts with a pneumatic circuit through a series of pilot valves and a pair of master cylinders. When the hydraulic fluid pressure drops below a predetermined level, this pressure drop is sensed and pneumatic pressure from a holding tank is introduced into the system to allow normal brake operation. The air pressure is also used to provide brake retarding capabilities. In the event of a mechanical breakdown, air pressure from the holding tank is supplied to a master cylinder by way of a parking brake valve. The air pressure acts upon one side of the master cylinder to pressurize hydraulic fluid on the other side which is in turn communicated to the brakes to effect their release. While this system is highly effective, the circuitry required to allow the brakes to be released in this manner is very extensive. Also, when the vehicle is disabled, the brakes may only be released from within the cab.

Other brake release systems utilize an entirely mechanical mechanism to override the spring force that holds the brakes in engagement. A typical device of this type is disclosed in U.S. Pat. No. 4,245,724, issued to H. E. Beck on Jan. 20, 1981. This patent teaches the use of a bolt or a plurality of bolts that may be inserted through an opening in the outer housing of the brake to engage a threaded aperture in a member that is attached to the brake piston. As the bolt is rotated, the piston is ultimately drawn away from its engaged position, against the bias of the spring, to allow free rotation of the braked members. While this system has also proven to be effective, it requires a working access to the parking brake to bring about its release. The parking brake is often located in an area that is not easily accessible, making this type of brake release very inconvenient. Also, specific tools are required to install and remove the bolts. If a failure occurs in an area where these tools are not readily available, further inconvenience is incurred.

The present invention is directed to overcoming one or more of the problems as set forth above.

DISCLOSURE OF THE INVENTION

In one aspect of the present invention, a brake assembly of the type that is spring applied and fluid pressure released is provided with an auxiliary actuation mechanism. The mechanism includes a fluid reservoir, an accumulator, and a valve means that communicates fluid between the accumulator and the brake assembly in a first position and in a second position communicates fluid between the brake assembly and the reservoir. A first and second auxiliary actuating means is provided to move the valve means between its first and second positions. With an actuating mechanism as set forth above, fluid under pressure from the accumulator is permitted to flow through the valve means to release the brake assembly from its engaged position. Two separate actuating means are provided to cause the valve means to shift to a position to permit the release of the brakes or to a position wherein engagement of the brakes is maintained. As such, one actuating means is mounted at a different location on the vehicle from the other to assure convenient and reliable actuation of the valve means under virtually any circumstance.

BRIEF DESCRIPTION OF THE DRAWINGS

The drawing is a schematic representation of a vehicle brake system that embodies the principles of the present invention.

BEST MODE FOR CARRYING OUT THE INVENTION

Referring now to the drawing, a vehicle brake system 10 is shown that includes a service brake assembly 12 that is generally operatively engaged with at least two wheels of a vehicle (not shown) to allow the vehicle to stop under normal operation. Since each service brakes assembly is identical to the other, only one is shown in the drawing and described hereinafter. Each service brake assembly 12 is normally held in the disengaged position shown in the drawing by a retraction spring 14 which engages the head end of a piston 16 and urges it and the connected rotation resisting elements to the right as viewed in the drawing. Hydraulic fluid is delivered to the service brake assembly 12 by a pump 18 which is driven by the vehicle's engine (not shown). The pump delivers fluid from a tank or reservoir 20 to an accumulator charging valve 22 by way of a fluid conduit or line 24. Interposed between the charging valve 22 and the pump 18 is a standard relief valve 26 that is well known in the art to be used to establish a maximum pump pressure. The accumulator charging valve communicates fluid to a first accumulator 28 through a line 30. The accumulator is provider with a charge of nitrogen to pressurize fluid as it is received from the pump. The pressure in the accumulator and line 30 increases to a predetermined maximum pressure, which in this application is around 1925 psi (13,300 kPa). The charging valve 22 is infinitely variable and senses the pressure in line 30 and will move to the right as viewed in the drawing to a second position to block communication between the pump 18 and the accumulator 28 when the maximum pressure is reached. Thereafter, the charging valve 22 will modulate between its open and closed positions to maintain that pressure within line 30.

An operation controlled service brake valve 32 is also connected to the charging valve 22 by line 30. The service brake valve 32 is a two position valve that is controlled by a foot pedal 34 and is normally held in the position shown in the drawing by a spring 36. In this position, fluid from line 30 is blocked from passage through the service brake valve 32. The service brakes 12 are connected to the service brake valve 32 by a line 38. The service brake valve is moved to its second position as the operator depresses the foot pedal 34 and fluid is communicated from line 30 to the brake assembly 12 via line 38. Fluid is directed to the side of the brake piston 16 opposite the spring 14 thus urging the piston against the bias of the spring 14 whereupon application of the service brakes is initiated.

Also included in the brake system 10 is a parking brake assembly 40. The parking brake assembly 40 may be operatively engaged with a driveline component such as an output transfer gear or the like, where the rotation of the driveline is restrained. The parking brake assembly is normally held in the disengaged position as shown in the drawing by fluid pressure that is communicated to the rod side of an actuating piston 42. The opposite side of the piston 42 is engaged by a spring 44 that urges the piston to the right as shown in the drawing or toward an engaged position of the parking brake assembly 40.

A parking brake valve 46 is included in the brake system 10 and selectively communicates fluid from line 30 to the parking brake assembly 40 via line 48 and a double acting check valve 50 that is interposed in line 48. The parking brake valve 46 is a two-position valve that is controlled by the operator and is detented to remain in either of the two positions until changed by the operator. In the position shown, fluid is permitted to pass through the valve line 48, and the double-acting check valve 50 to provide fluid to the brake assembly to disengage the parking brake, thus permitting normal vehicle operation. If the operator moves the parking brake valve 46 to the left as viewed in the drawing, communication to the parking brake assembly 40 is blocked and the fluid pressure within the brake assembly is drained to the reservoir 20. At this point the parking brake 40 becomes engaged under the bias of spring 44, preventing the rotation of the vehicle driveline. Likewise, if the pressure in the system should drop due to a mechanical failure, the bias of the spring 44 will cause the engagement of the parking brake 40 to bring the vehicle to a stop.

The brake system 10 further includes an auxiliary actuating mechanism 52 for controlling the parking brake 40. The auxiliary actuating mechanism 52 includes a second or auxiliary accumulator 54 that is pressurized in the same manner as the first accumulator 28 since it is also in communication with line 30 via line 56. A one-way check valve 58 is positioned in line 56 to permit fluid flow from line 30 to the auxiliary accumulator 54 but prevents fluid flow from the accumulator to line 30. The auxiliary accumulator 54 also communicates with an auxiliary actuation valve 60 through line 56. The auxiliary actuation valve is a two-position valve that is normally positioned to block communication of fluid therethrough. The other side of the auxiliary actuating valve 60 is communicated with the double-acting check valve 50 via line 62.

The auxiliary accumulator 54 and the auxiliary actuating valve 60 are both mounted to a common frame or base member 64 which in the present invention is attached to the rear of the vehicle's cab (not shown). Adjacent the auxiliary actuating valve 60 is an actuating lever 68 that is also pivotally mounted to the base member 64 at 70. A connecting rod 72 extends from a mid portion 74 of the actuating lever to the auxiliary actuating valve 60 where it is operatively connected to the valve.

A first auxiliary actuating means 75 is also mounted to the base member 64 to affect the positioning of the actuating lever 68 and includes a first bellcrank member 76 which is pivotally mounted to the base member 64 at a location that is laterally adjacent a distal end 78 of the actuating lever 68. The first bellcrank 76 has a first arm 80 that is pivotally connected to the distal end 78 of the actuating lever 68 by a connecting rod 81. A second arm 82 of the bellcrank 76 mounts one end 84 of a first push-pull type, cable control mechanism 86. The other end 87 of the cable control mechanism 86 is positioned at a first remote location 88 from the base member 64 and in this instance is mounted in the cab of the vehicle and terminates at a push-pull actuator or control knob 89.

A second auxiliary actuating means 90 is mounted to the base member 64 and includes a second bellcrank member 91 that is pivotally mounted to the base member 64 at a location that is also laterally adjacent the distal end 78 of the actuating lever 68; however, it is positioned on the opposite side thereof from the first bellcrank member 76. The second bellcrank 91 has a first arm 92 that is pivotally connected to the distal end 78 of the actuating lever 68 by a connecting rod 93. A second arm 94 of bellcrank 91 mounts a first end 96 of a second push-pull type cable control mechanism 98. In the instant application, the second end 100 of the cable control mechanism 98 terminates at a push-pull actuator or control knob 102 that is mounted at a second remote location 104 on the vehicle, such as on a rear bumper thereof.

INDUSTRIAL APPLICABILITY

When a vehicle is being operated under normal conditions, the brake system 10 is placed in the condition illustrated in the drawing. Fluid from the pump 18 has been introduced to the accumulator 28 and a predetermined amount of pressure has been established in line 30 by the accumulator charging valve 22. Fluid flow to the service brakes 12 is blocked by the brake valve 32 and they are held in their disengaged position by the spring 14. The parking brake valve 46 is detented to a position that allows fluid to communicate with the parking brake 40 to maintain the parking brake in its disengaged position.

In the event of a mechanical breakdown that would render the pump or the engine that drives the pump inoperative, fluid pressure to the parking brake assembly 40 would be reduced to a point that could no longer overcome the bias of the spring 44 and the driveline brake would then become engaged. In order to provide the release of the parking brake assembly 40, the auxiliary actuating mechanism 52 may be actuated from either of the first or second auxiliary actuating means 75 and 90 by movement of either of the cable control knobs 89 and 102 which are located in separate remote locations 88 and 104 such as the cab and on the rear bumper respectively. Upon actuation of either control knob, the actuating lever 68, through the movement of either bellcrank 76 or 91, will be moved clockwise. This movement will in turn cause the auxiliary actuating valve 60 to be repositioned to the right as viewed in the drawing. When this occurs, pressure from the auxiliary accumulator 54 which has been maintained in line 56 by the check valve 58 and the actuating valve 60, is allowed to pass into line 62 to the double-acting check valve 50 which is repositioned to block fluid communication to line 48. Fluid is then communicated from the double-acting check valve 50 to the parking brake assembly 40 to effect the disengagement thereof so that the disabled vehicle may be towed away for repairs.

An auxiliary actuating mechanism 52 of this configuration permits the actuation of a hydraulic system to cause the disengagement of the spring applied parking brake of a vehicle. The actuation of the system may be brought about by one of two remotely positioned control knobs that are positioned within the cab and on the rear bumper respectively. Being so positioned, actuation of the system may be done conveniently without requiring the use of special equipment or tools.

Other aspects, objects and advantages of this invention can be obtained from a study of the drawing, the disclosure, and the appended claims.

We claim:

1. In a vehicle having a brake system that includes a brake assembly of the type that is spring applied and fluid pressure released, and a primary means for actuating said brake assembly under normal operating conditions, including a fluid reservoir, a source of pressurized fluid, and a valve means that selectively directs the pressurized fluid between the brake assembly and the fluid reservoir, an auxiliary actuation mechanism adapted to be mounted to said vehicle, comprising:
   an accumulator;
   a valve means having a first position wherein fluid is communicated between the accumulator and the brake assembly to cause the disengagement thereof and a second position wherein fluid is communicated between the brake assembly and the fluid reservoir to allow engagement of the brake assembly;
   an actuating lever pivotally mounted to the vehicle and being positioned adjacent the valve means and connected thereto;
   a pair of bellcranks pivotally mounted to the vehicle on opposite sides of the actuating lever, each bellcrank having a first arm connected with a distal end portion of the actuating lever and a second arm; and
   means for actuating said valve means connected to the second arms of the respective bellcranks, said actuating means being separate from the primary actuating means having at least two remote locations from which said valve means may be actuated between said first and second positions.

2. The auxiliary actuation mechanism as set forth in claim 1 wherein the vehicle is provided with a cab assembly and a control actuator of one of the remote actuating means is positioned within the cab assembly.

3. The auxiliary actuation mechanism as set forth in claim 2 wherein the accumulator and the valve means are positioned on a base member which is in turn secured to the rear of the cab assembly.

4. The auxiliary actuation mechanism as set forth in claim 3 wherein the actuating lever is pivotally mounted to the base member at one end portion thereof.

5. The auxiliary actuation mechanism as set forth in claim 4 wherein the valve means is connected to the actuating lever at a mid portion thereof.

6. The auxiliary actuation mechanism as set forth in claim 4 wherein each bellcrank is pivotally mounted to the base member at a juncture between the respective first and second arms.

7. The auxiliary actuation mechanism as set forth in claim 1 wherein the vehicle is provided with a rearwardly extending bumper assembly and a control actuator of one of said remote actuating means is mounted to the rear bumper assembly.

8. The auxiliary actuation mechanism as set forth in claim 1 wherein the brake system includes a source of pressurized fluid and a charging valve in communication with said pressurized fluid, said charging valve being in communication with the accumulator to provide a preselected amount of fluid pressure within the accumulator.

9. The auxiliary actuation mechanism as set forth in claim 8 wherein the primary means for actuating the brake assembly includes a valve that is movable by an operator between a normal operating position wherein pressurized fluid is communicated through the valve to the brake assembly to maintain the disengagement of the brake assembly, and a second position wherein pressurized fluid is blocked from communication with the brake assembly and the fluid within the brake assembly is directed to the reservoir to permit the engagement of the brake assembly.

10. In a brake assembly of the type that is spring applied and fluid pressure released and having a primary means for actuating said brake under normal conditions, an auxiliary actuation mechanism comprising:
   a base member;
   a fluid reservoir;
   an accumulator mounted to the base member;
   a valve means mounted to the base member and being movable between a first position wherein fluid is communicated between the accumulator and the brake assembly and a second position wherein fluid is communicated between the brake assembly and the fluid reservoir;
   an actuating lever operatively associated with said valve means and being pivotally mounted to the base member adjacent thereto;
   a first bellcrank mounted to the base member on one side of the actuating lever, said bellcrank having a first arm connected to the actuating lever and a second arm;
   a second bellcrank mounted to the base member on a side of the actuating lever opposite that of the first bellcrank, said second bellcrank having a first arm connected to the actuating lever and a second arm;
   a first auxiliary means for actuating the valve means between the first and second positions, said first auxiliary means being operatively connected to the second arm of the first bellcrank; and a second auxiliary means for actuating the valve means between said first and second positions, said actuating means being operatively connected to the second arm of the second bellcrank.

11. The auxiliary actuation mechanism as set forth in claim 10 wherein the valve means is pivotally connected to the actuating lever at a mid portion thereof.

12. Auxiliary actuation mechanism as set forth in claim 10 wherein the first actuating means includes a cable control mechanism that extends between the second arm of the first bellcrank and a control actuator, said control actuator being movable to cause the rotation of the first bellcrank and the actuating lever about their respective mountings and thus the movement of the valve means to its first position to communicate fluid between the accumulator and the brake assembly to provide the disengagement thereof and its second position to communicate fluid between the brake assembly and the fluid reservoir to permit the engagement of the brake assembly.

13. The actuation mechanism as set forth in claim 10 wherein the second auxiliary actuating means includes a cable control mechanism that extends between the second arm of the second bellcrank and a cable control actuator, said control actuator being movable to cause the rotation of the second bellcrank and the actuating lever about their respective mountings to cause the movement of the valve means between its first position wherein fluid is communicated between the accumulator and the brake assembly to provide the disengagement of the brake assembly and its second position wherein the fluid is communicated between the brake assembly and the fluid reservoir to permit the engagement of the brake assembly.

* * * * *